(12) United States Patent
Platzer et al.

(10) Patent No.: US 10,330,794 B2
(45) Date of Patent: Jun. 25, 2019

(54) AIS SPOOFING AND DARK-TARGET DETECTION METHODOLOGY

(71) Applicant: SPIRE GLOBAL, INC, San Francisco, CA (US)

(72) Inventors: Peter Platzer, Mountain View, CA (US); Pierre-Damien Vaujour, San Francisco, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 403 days.

(21) Appl. No.: 15/090,119

(22) Filed: Apr. 4, 2016

(65) Prior Publication Data

US 2017/0285178 A1    Oct. 5, 2017

(51) Int. Cl.
  *G01S 19/45* (2010.01)
  *G01S 19/42* (2010.01)
  (Continued)

(52) U.S. Cl.
  CPC ............ *G01S 19/42* (2013.01); *G01S 5/0263* (2013.01); *G01S 19/45* (2013.01); *G01S 5/16* (2013.01);
  (Continued)

(58) Field of Classification Search
  CPC .......... G01S 19/43; G01S 19/52; G01S 19/21; G01S 19/215; G01S 19/42; G01S 19/45; G01S 5/0263; G01S 5/0268
  (Continued)

(56) References Cited

U.S. PATENT DOCUMENTS

| 5,410,728 A | 4/1995 | Bertiger et al. |
| 5,604,920 A | 2/1997 | Bertiger et al. |

(Continued)

FOREIGN PATENT DOCUMENTS

| EP | 1037405 A2 | 9/2000 |
| EP | 2954288 A2 | 8/2014 |
| WO | 20140121197 A3 | 8/2014 |

OTHER PUBLICATIONS

Canadian Office Action issued in Canadian Patent Application No. 2,897,803 dated Sep. 27, 2017.
(Continued)

*Primary Examiner* — Chuong P Nguyen
(74) *Attorney, Agent, or Firm* — Troutman Sanders LLP

(57) ABSTRACT

Methods and systems detect physical locations of vessels. A first satellite includes a first image sensor. A second satellite includes a second image sensor. The processor receives a first image of a target area from the first image sensor, and a second image of the target area from the second image sensor. Both images are taken within a predetermined time frame. The processor performs image recognition to identify a vessel that appears in both the first image and the second image. The processor receives the first satellite's location and orientation when the first image is taken and the second satellite's location and orientation when the second image is taken. Each satellite's location and orientation are determined by the satellite's geographic determination module. The processor determines the vessel's location by performing triangulation based on the first satellite's location and orientation and the second satellite's location and orientation. The processor outputs data representative of the vessel's determined location. The vessel's speed and bearing are also determined by the processor.

11 Claims, 8 Drawing Sheets

(51) Int. Cl.
*G01S 5/02* (2010.01)
*G01S 19/21* (2010.01)
*G01S 5/16* (2006.01)
*G01S 11/12* (2006.01)
*G06T 7/70* (2017.01)

(52) U.S. Cl.
CPC ............. *G01S 11/12* (2013.01); *G01S 19/215* (2013.01); *G06T 7/70* (2017.01)

(58) Field of Classification Search
USPC .... 342/357.25, 357.28, 357.35, 357.59, 451; 701/468, 474
See application file for complete search history.

(56) References Cited

U.S. PATENT DOCUMENTS

| | | |
|---|---|---|
| 5,940,739 A | 8/1999 | Conrad et al. |
| 5,963,166 A | 10/1999 | Kamel |
| 6,067,453 A | 5/2000 | Adiwoso et al. |
| 6,271,877 B1 | 8/2001 | LeCompte |
| 6,340,947 B1* | 1/2002 | Chang ................... G01S 5/0054 342/357.43 |
| 6,381,228 B1 | 4/2002 | Prieto, Jr. et al. |
| 6,584,452 B1 | 6/2003 | Prieto, Jr. et al. |
| 7,230,944 B1 | 6/2007 | Massie et al. |
| 7,911,372 B2* | 3/2011 | Nelson .................. G01S 13/003 342/179 |
| 8,411,969 B1 | 4/2013 | Joslin et al. |
| 9,185,639 B1* | 11/2015 | Sherman ............... H04W 48/16 |
| 9,246,575 B2* | 1/2016 | De Latour ......... H04B 7/18508 |
| 9,519,873 B2 | 12/2016 | Platzer |
| 2003/0122705 A1* | 7/2003 | Marko ..................... G01S 5/10 342/357.2 |
| 2003/0217362 A1 | 11/2003 | Summers et al. |
| 2004/0113835 A1* | 6/2004 | Jones .................... G01S 13/449 342/160 |
| 2004/0263386 A1 | 12/2004 | King et al. |
| 2007/0182628 A1 | 8/2007 | Pomerantz et al. |
| 2007/0208513 A1 | 9/2007 | Hillman |
| 2008/0071633 A1 | 3/2008 | Ozkan et al. |
| 2009/0007240 A1 | 1/2009 | Vantalon et al. |
| 2011/0304502 A1 | 12/2011 | Chen et al. |
| 2012/0018585 A1 | 1/2012 | Liu et al. |
| 2012/0092213 A1 | 4/2012 | Chen |
| 2013/0018529 A1 | 1/2013 | Ploschnitznig |
| 2013/0058271 A1* | 3/2013 | De Latour ......... H04B 7/18508 370/315 |
| 2014/0218242 A1* | 8/2014 | Platzer .................. G01S 5/0027 342/454 |
| 2014/0222472 A1 | 8/2014 | Platzer |
| 2015/0192696 A1 | 7/2015 | Platzer |
| 2017/0168133 A1* | 6/2017 | Daehler ................ G01S 5/0263 |
| 2018/0205444 A1* | 7/2018 | Delay .................. H04B 7/1851 |

OTHER PUBLICATIONS

Carson-Jackson, "Satelite AIS—Developing Technology or Existing Capability?", The Journal of Navigation (2012), vol. 65, pp. 303-321.
Extended European Search Report dated Jul. 22, 2016 issued in corresponding European Patent Application No. 14745871.5.
Høye et al., "Spaced based AIS for global maritime traffic monitoring", Acta Astronautica (2008), vol. 62, pp. 240-245.

* cited by examiner

AIS SPOOFING AND DARK-TARGET DETECTION METHODOLOGY

CROSS REFERENCE TO RELATED PATENT APPLICATIONS

This disclosure incorporates by reference pending U.S. patent application Ser. No. 13/961,875, filed on Aug. 7, 2013, entitled "Computerized Nano-Satellite Platform for Large Ocean Vessel Tracking," the content of which is incorporated by reference herein as if it was restated in full.

TECHNICAL FIELD DISCLOSED

Embodiments of the disclosed technology relate to tracking ocean/sea traversing vessels based on one or more detection techniques including radio frequency detection, Automatic Identification Systems (AIS), and visual data. The disclosed technology discloses methods and systems for detecting physical locations, speeds and bearings of vessels when the vessels do not provide AIS data or fail to provide correct AIS data.

BACKGROUND DISCLOSED

Today, a lot of vessels are equipped with a technology called Automatic Identification System (AIS) that periodically broadcasts or announces certain information about each vessel using select radio frequencies. The use of AIS is mandated under the United Nations SOLAS convention for all international vessels over 300 tons, cargo vessels over 500 tons and passenger ships of all sizes. Coastal authorities rely on the AIS information to coordinate, manage and track maritime traffic near the coast. The AIS information is vital to ensuring a vessel's safe and legal path through the ocean, and in the prevention of accidents, piracy, illegal fishing, and human trafficking, among other illicit activities.

Typically, an AIS transponder is installed on a vessel and programmed to automatically broadcast a message, such as a beacon, containing data including the vessel's identity, speed, heading and navigational status, on a periodic basis such as every 2-10 seconds. The AIS transponder broadcasts the message in certain predefined radio frequency channels, including for example, AIS 1 (161.9625-161.9875 MHz) and AIS 2 (162.0125-162.0375 MHz), among others.

However, not all vessels are equipped with AIS. Sometimes, vessels that are equipped with AIS would deliberately disable broadcasting AIS beacons. For example, a vessel that does not wish its action to be known can circumvent the AIS by powering down the AIS or disabling its AIS beacon. Once the AIS is powered off, the vessel becomes a "dark target" or goes off-the-grid. In another example, a vessel may also spoof its AIS by modifying the information sent to reflect an incorrect name, location, speed, or bearing. Without revealing its true information, vessels may engage in illegal activities. Such illegal activities create serious problems for law enforcement, insurance agencies, governments and shipping companies, among others. In addition, a faulty or non functioning AIS can be a safety hazard.

Therefore, there is a need for a mechanism to track vessels in the absence of correct AIS data.

BRIEF SUMMARY DISCLOSED

One aspect of the present technology relates to a system for determining a vessel's location in a target area. A first satellite has a first image sensor and a first geographic determination module. A second satellite has a second image sensor and a second geographic determination module. A processor is in communication with the first image sensor and the second image sensor. The processor is configured to output data indicating a target area to the first satellite and the second satellite. The processor receives a first image of the target area from the first image sensor, and a second image of the target area from the second image sensor. Both images are taken within a predetermined time frame. The processor performs image recognition to identify a vessel that appears in both the first image and the second image. The processor receives the first satellite's location and orientation when the first image is taken. The first satellite's location and orientation are determined by the first geographic determination module. The processor receives the second satellite's location and orientation when the second image is taken. The second satellite's location and orientation are determined by the second geographic determination module. The processor determines the vessel's location by performing triangulation based on the first satellite's location and orientation and the second satellite's location and orientation. The processor outputs data representative of the vessel's determined location. In one example, the processor also determines the vessel's speed and bearing by performing triangulation based on the first satellite's location and orientation and the second satellite's location and orientation.

Another aspect of the present technology relates to a method for determining a vessel's location in a target area. A processor outputs data indicating a target area to a first satellite and a second satellite. The processor receives a first image of the target area from a first image sensor on the first satellite, and a second image of the target area from a second image sensor on the second satellite. Both images are taken within a predetermined time frame. The processor performs image recognition to identify a vessel that appears in both the first image and the second image. The processor receives the first satellite's location and orientation when the first image is taken. The first satellite's location and orientation are determined by a first geographic determination module on the first satellite. The processor receives the second satellite's location and orientation when the second image is taken. The second satellite's location and orientation are determined by a second geographic determination module on the second satellite. The processor determines the vessel's location by performing triangulation based on the first satellite's location and orientation and the second satellite's location and orientation. The processor outputs data representative of the vessel's determined location.

A further aspect of the present technology relates to a system for determining a vessel's location in a target area. A first satellite includes a first image sensor and a first geographic determination module. A second satellite includes a second image sensor and a second geographic determination module. A processor is in communication with the first image sensor and the second image sensor. The processor is configured to output data indicating a target area to the first satellite and the second satellite. The processor receives a first image of the target area from the first image sensor. The first image is associated with the first satellite's location and orientation when the first image is taken. The first satellite's location and orientation are determined by the first geographic determination module. The processor receives a second image of the target area from the second image sensor. The second image being associated with the second satellite's location and orientation when the second image is taken. The second satellite's location and orientation are determined by the second geographic determination module. The first image and the second image are taken within a predetermined time frame. The processor performs image recognition to identify a vessel that appears in both the first image and the second image. The processor identifies an overlapping area between the first image and the second image. The processor determines the vessel's location based on the overlapping area. The processor outputs data representative of the vessel's determined location.

In one example, the processor receives a plurality of images capturing the vessel over time. Each image is associated with a timestamp, satellite location and orientation when the image is taken. The processor determines the vessel's speed and bearing based on the plurality of images.

In yet another aspect, the present technology relates to a method for determining a vessel's location in a target area. A processor outputs data indicating a target area to the first satellite and the second satellite. The processor receives a first image of the target area from a first image sensor on the first satellite. The first image is associated with the first satellite's location and orientation when the first image is taken. The first satellite's location and orientation are determined by a first geographic determination module on the first satellite. The processor receives a second image of the target area from a second image sensor on the second satellite. The second image is associated with the second satellite's location and orientation when the second image is taken. The second satellite's location and orientation are determined by a second geographic determination module on the second satellite. The first and second images are taken within a predetermined time frame. The processor performs image recognition to identify a vessel that appears in both the first image and the second image. The processor identifies an overlapping area between the first image and the second image. The processor determines the vessel's location based on the overlapping area. The processor outputs data representative of the vessel's determined location.

Various aspects of the described example embodiments may be combined with aspects of certain other example embodiments to realize yet further embodiments. It is to be understood that one or more features of any one example may be combined with one or more features of the other example. In addition, any single feature or combination of features in any example or examples may constitute patentable subject matter. Other features of the technology will be apparent from consideration of the information contained in the following detailed description.

BRIEF DESCRIPTION OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed.

DETAILED DESCRIPTION

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

1. Satellite

Figure 1:
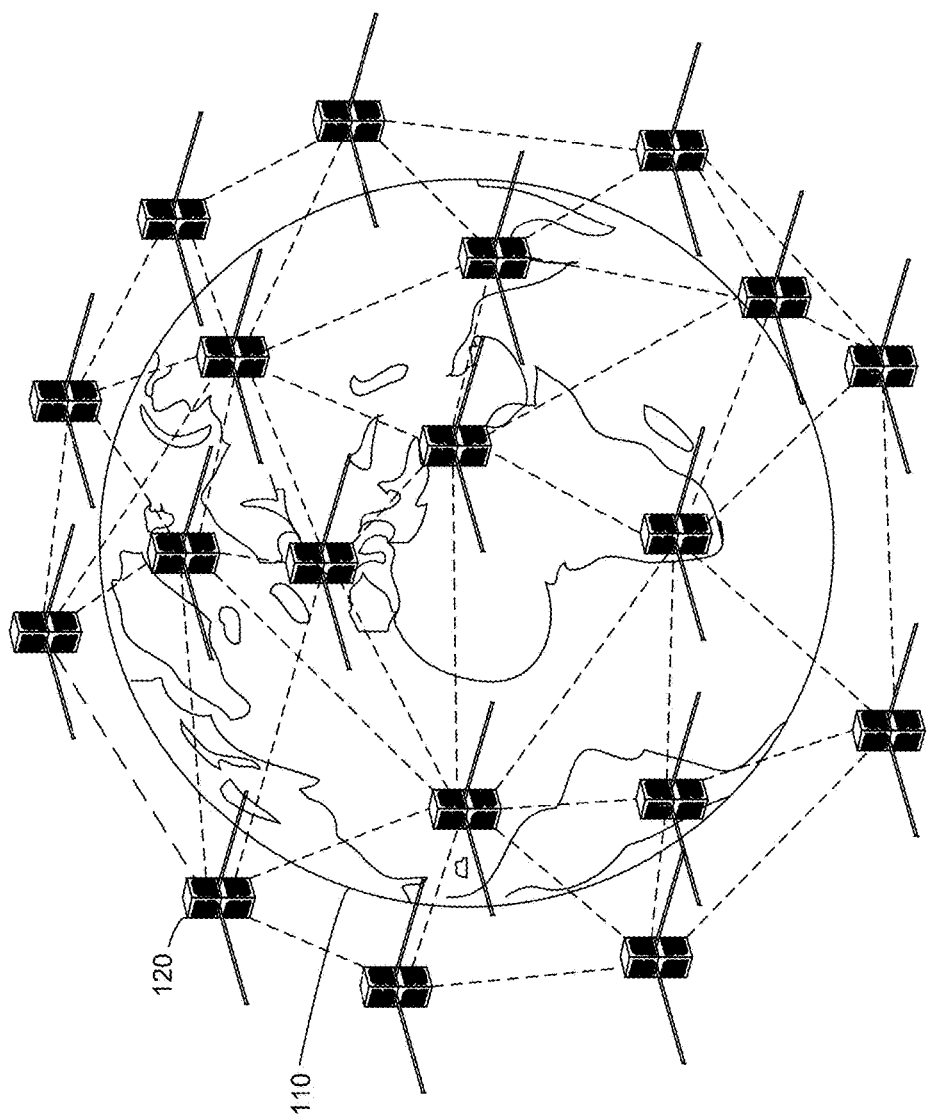
FIG. 1 illustrates an example terrestrial and orbital communication network according to one aspect of the disclosed technology.

The present application relates to, but not limited to, a terrestrial and orbital communication network having a constellation of satellites. FIG. 1 illustrates an exemplary terrestrial and orbital communication network 100 covering at least a portion of a planet 110, such as the Earth. The network 100 may include a constellation of satellites 120 each configured to collect data from a point on the planet from time to time or on a regular basis. The satellite 120 may analyze the collected data to monitor maritime activities, including but not limited to tracking ship or oceangoing vessels, detecting illegal, unreported and unregulated fishing or pirate activities, monitoring trade transit, and detecting oil spills, among other possibilities.

The satellite 120 may be a miniature satellite in any small form factor, including but not limited to any one of the following, a small satellite, a microsatellite, a nanosatellite, a picosatellite and a femtosatellite. In one embodiment, the satellite 120 may be based on an industry standard for cubesats, developed in 2001 by Stanford University and California Polytechnic Institute. In one embodiment, the satellite 120 may not exceed 10 cm×10 cm×30 cm in size and may not exceed 10 kg in mass.

Each satellite 120 may broadcast information to other satellites in the orbital network 100 via one or more transmission links. Each constellation satellite may be programmed and configured to link to other constellation satellites within range and forward data sent by those satellites. The satellite constellation may form an ad hoc wireless data network with each satellite acting as a node. The network may be formed in a variety of topologies adapted to specific needs. The topology and data routing may be determined dynamically according to the connectivity and operational status of the satellite-nodes.

In some embodiments, the satellite 120 may communicate with non-cubesat satellites. For example, the satellite 120 may communicate with permanent, large satellites, such as dish network located at 23 k miles geostationary orbit.

In one example, the constellation of satellites may pass over the same area frequently—frequently enough to be able to track a vessel as it travels across the ocean, thereby determining its bearing and speed, information crucial to law enforcement, governments and other customers looking to intercept such vessel.

Each additional satellite in the constellation may increase temporal resolution and coverage, and provide more opportunity for intersatellite communication. In one example, the constellation may include 10 or more satellites for supporting global vessel based tracking and monitoring. In another example, the constellation may include 50 to 100 satellites for increased reliability and performance. In one example where fewer than 10 satellites are deployed, time windows between tracking events may range between 2-6 hrs. For a constellation of 50 satellites, the temporal range for monitoring select regions of ocean comprising vessel traffic may drop to 2-10 minutes.

Figure 2:
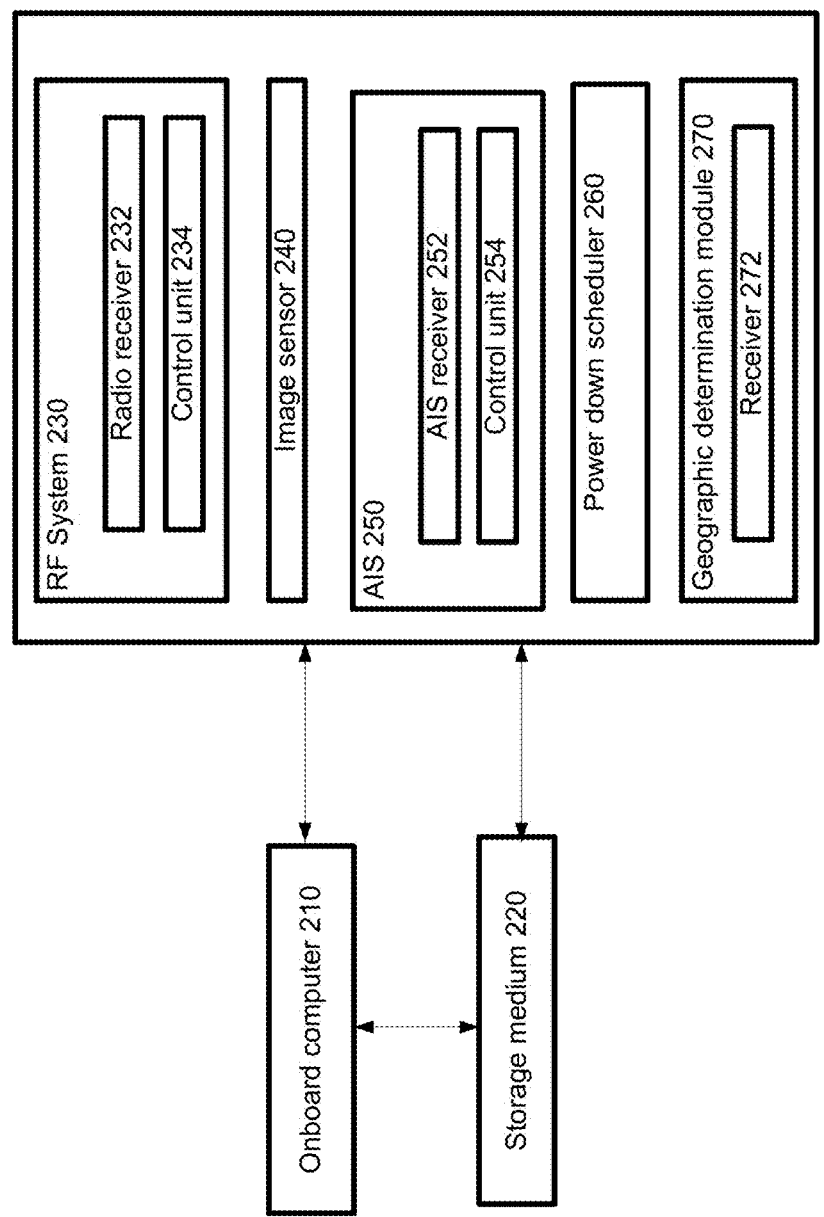
FIG. 2 is an exemplary block diagram of satellite architecture according to one aspect of the disclosed technology.

FIG. 2 illustrates an exemplary block diagram of the satellite architecture 200 according to one aspect of the disclosed technology. As illustrated, the satellite 120 may include one or more of the following: an onboard computer 210 that acts as a processor, a non-transitory computer-readable storage medium 220, a radio frequency system 230 for detecting radio transmissions from vessels, an image sensor 240 for capturing still and video images of the vessels, an automatic identification system 250 for receiving beacons broadcast by the vessels, and a geographic determination module 270 for determining satellite location and orientation. Although not illustrated, the satellite 120 may also include many other sensors including but not limited to a sun sensor, a GPS radio occultation receiver, a thermopile array, a sensor for remote detection of surface temperature, a spectroscopy, an accelerometer, a magnetic sensor, a gyroscope, a gravimetric sensor, and a radar, among other possibilities.

In some embodiments, the satellite 120 may include a power down scheduler 260. The scheduler may control power usage of the satellite 120, such as increasing or decreasing the power usage of the satellite 120. To do so, the scheduler 260 may connect or disconnect one or more components or subsystems of the satellite 120 from a power supply, e.g., a battery. The scheduler 260 may adjust the power usage based on time, location or a combination thereof. For example, the scheduler 260 may adjust the power usage based on specific time by monitoring a system clock. In another example, the scheduler 260 may adjust the power usage based on specific location of the satellite by monitoring a GPS sensor. Algorithms of the power down scheduler 260 may be updated in real time or quasi real time based on any new tasks assigned to the satellite 120.

In one embodiment, the satellite 120 may have two modes: a power-up mode and a power-down mode. The power-up mode may occur when the satellite 120 is in a field of view of another satellite or a ground station for transmission. The power-down mode may occur when the satellite 120 is not in the field of view of any satellite or ground station for transmission. The power down scheduler 260 may control the satellite 120 to alternate between the two modes.

1.1 Radio Frequency System

As shown in FIG. 2, the radio frequency system 230 may include a radio receiver 232, such as a UHF/VHF radio. The radio receiver 232 may be tuned to select transmission frequencies associated with signals of vessels. In one example, a telecommunication link may be established between a satellite and a vessel on one or more UHF and/or VHF radio bands. The radio frequency system 230 may identify signals from the vessel, thus unmasking the true location, speed and bearing of the vessel.

The radio frequency system 230 may also broadcast messages, such as beacons for identification purposes, to one or more other satellites or ground stations. Depending upon the power state, the radio frequency system 230 may broadcast messages on a regular basis or upon demand. In one example, the radio frequency system 230 may also include an S-band radio. The S-band radio may be configured to broadcast radio messages.

In addition, the radio frequency system 230 may include a control unit 234. The control unit 234 may receive radio messages from the radio receiver 232. The control unit 234 may generate command signals based on the radio messages. The control unit 234 may transmit the command signals to a plurality of systems in satellite 120 via a controller area network bus.

In one embodiment, the radio frequency system 230 may be a software defined radio (SDR) communication system that establishes telecommunication links through a wide spectrum of radio frequencies with adjustable flexibility to meet various needs and demands.

1.2 Image Sensor

Each satellite 120 may include one or more image sensors 240 to capture live images, videos or a combination thereof of objects within its field of view. As a result, the image sensor 240 may capture images or videos of a vessel so as to detect the vessel's presence, physical location, speed and bearing.

The image sensor 240 may be a camera. In one example, the image sensor is an optical camera. The image sensor 240 may be a digital video camera. In one embodiment, the image sensor 240 is a high definition digital camera or similar system to capture images within the visible spectrum. In another embodiment, the image sensor 240 is a multispectral or hyperspectral digital camera system to capture images over a wide range of the electromagnetic spectrum. In yet another embodiment, the image sensor 240 is a narrow spectrum camera system optimized for capturing images from a task-optimized spectrum band. For example, an IR camera may capture images through the upper cloud layer and detect heat signatures emanating from a ship.

The feed from each image sensor 240 may be made available to local and remote users. In one example, the feed may be first routed to a ground station computer. The ground station computer may make the feed available to local and remote users through the Internet or other network link. The feed may be processed in real time or stored in a memory for later review and processing Images may be geolocated using the location and orientation data of the satellite as determined by the geographic determination module 270. When an image is taken, it may be immediately associated with the satellite location as determined by the geographic determination module 270. The image may also be immediately associated with the satellite orientation. Multiple images and data may be compared and error corrected to increase geolocation accuracy.

Image recognition algorithms may be applied to the captured images to identify vessels and other objects in the observed area. The geolocation of the identified vessels and objects may then be determined using the image geolocation data.

Successive images may be captured with corresponding image and vessel/object location determinations. Each vessel's speed and bearing may also be determined using the geolocation data of the successive images. In one embodiment, information on the speed and bearing of a vessel or object may be derived from changes in the determined locations of the vessel or object between images.

Using the one or more installed camera systems, the satellite constellation network may provide near real time imagery data over the entire globe. The constellation provides mission operators with a high degree of flexibility in how images are captured. For example, to increase the frequency of image update, many satellites may be instructed to capture and transmit images of the same area as they pass by the area. To track a vessel that does not have AIS abilities or intentionally provides misleading data, the constellation of satellites may be tasked to focus their cameras on the vessel as they pass over it, allowing on-going tracking of the vessel. In other words, the constellation does not lose track of the vessel because there are enough satellites in the area to continually track the vessel. The number of correlating satellites may vary, but a higher number of satellites used correlates to a greater accuracy in location, speed and bearing determination of vessels and tracking.

1.3 Automatic Identification System

The AIS 250 may detect AIS signals. The AIS 250 may include a dedicated AIS signal receiver 252 and a control unit 254, or a software defined radio (SDR) system configurable to receive and process AIS signals. In one embodiment, the AIS 250 may include a high-gain or other type of directional antenna for detecting AIS signals for higher sensitivity and to provide control over an observed area. In another embodiment, the AIS 250 may include a low-gain antenna to detect AIS signals over a larger observable area. In yet another embodiment, the AIS 250 may include a combination of high-gain and low-gain antennas acting in concert to provide a broad view of detected AIS signals and to lock on to a specific AIS signal or group of AIS signals. In some embodiments, the AIS 250 may include more than one AIS receiver.

The AIS receiver 252 may record a vessel's reported location, speed and bearing. The reported location may be compared to the vessel's true location as determined based on other sensors. Similarly, the reported speed and bearing may also be compared to the vessel's true speed and bearing as determined based on other sensors. Any discrepancy may be reported to authorities or relevant personnel.

In one embodiment, when a satellite is positioned at an altitude of 1000 km with an operating field of view to the horizon (~3630 nautical mile sweep), the AIS receiver 252 may receive up to 6200 ship signals simultaneously. In a further example, when a satellite is positioned at an altitude of 500 km, the AIS receiver 252 may receive up to 1550 ship signals.

AIS transmissions may be tracked by multiple concurrent satellites and organized by signal strength to filter overlapping AIS signals. Once the system associates a particular signal/strength to a particular vessel within the grid under review, second and later passes by other satellites provide embellishing data allowing increasing confidence by the system as to each tracked AIS/vessel. As more satellites receive the same AIS, de-collision processing results in a very high level of accuracy regarding signal fidelity.

In some embodiments, multiple satellites may each include one or more smaller antennas to form a phased array configuration for directional control of the observed area and obtain higher signal gains. Phased arrays, when capable of beam forming, may allow directional control over the observed area without the need for physically orienting the satellite platform.

Each AIS receiver 252 may have a field of view controllable by adjusting its associated antenna reception characteristics. This may be accomplished by selecting an antenna with the desired reception profile or, in the case of a phased array, shaping the reception beam. In another embodiment, the field of view is controlled by reorienting the satellite. When a constellation of satellites cover an area, it is possible to increase the probability of detection by limiting each receiver's field of view, but still provide high coverage and data updates.

1.4 Geographic Determination Module

The geographic determination module 270 may determine the satellite location. The geographic determination module 270 may also determine the satellite orientation. The geographic determination module 270 may include a Global Navigation Satellite System (GNSS) system or Global Positioning System (GPS). The geographic determination module 270 may include a receiver 272 to determine location of the satellite 120. The receiver 272 may reside on a radio occultation payload of the satellite 120. The receiver 272 may be a GPS radio occultation receiver, such as a GPS radio occultation sensor (GPS-RO) receiver. In another example, the geographic determination module 270 may rely on information provided by Joint Space Operations Center (JSpOC) of the U.S. government. In yet another example, the geographic determination module 270 may rely on information obtained from other networks or systems, such as Doppler Orbitography and Radiopositioning Integrated by Satellite (DORIS). It is foreseeable that the geographic determination module 270 may be improved in the future to implement other mechanisms to determine the satellite location and orientation.

2. Ground Station

Figure 3:
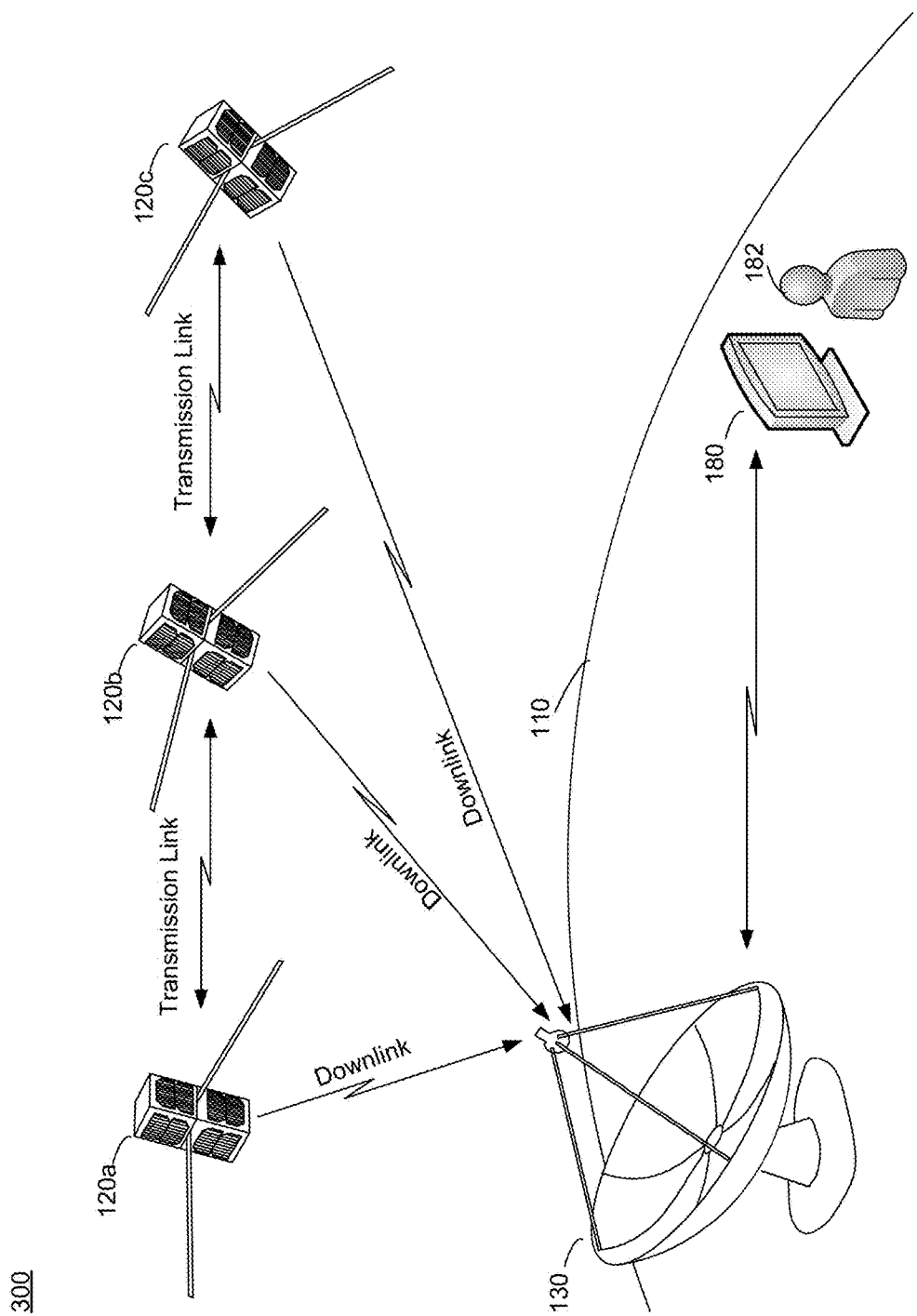
FIG. 3 illustrates communications between satellites, ground stations and a central communication center according to one aspect of the present technology.

With reference to FIG. 3, each satellite 120 may also communicate with one or more reception devices 130. In one example, the reception device 130 is a ground station. The ground station 130 may locate on the surface of the Earth 110. The ground station 120 may be a terrestrial terminal station for receiving radio waves generated by one or more satellites 120. The ground station 130 may include an antenna, such as a parabolic antenna, for receiving radio waves from the satellite 120.

The ground station 130 may function as a hub connection for one satellite 120, or constellation of satellites with a terrestrial telecommunication network, such as the Internet. The ground station 130 may communicate with one or more satellites 120 by transmitting and receiving radio waves. When the ground station 120 successfully receives radio waves from a satellite 120, or vice versa, a telecommunication link may be established. In some embodiments, the ground station 130 may upload computer programs or issue commands over an uplink to a satellite 120. Each ground station 130 may be identified by a unique identifier.

The ground station 130 may establish point-to-point links through a directional antenna mounted to a rotor which follows satellites 120 across the sky. This embodiment may allow high bandwidth uplink and downlink communications.

The satellite 120 may broadcast information to the ground station 130 when the ground station 130 is within the sight of the satellite 120 or within a predetermined range of the satellite 120. Due to its low earth orbit, each satellite 120 may have a relatively narrow window period of viable transmission with each ground station 130. Nevertheless, each satellite may maintain near real-time communications with a ground station. For example, when a satellite is not within a communication range of a ground station, the satellite may send its data payload to the ground station via any other connected constellation satellite. As a further example, if ground stations are strategically placed throughout the world, a given satellite can almost continually be in contact with a ground station.

Figure 4:
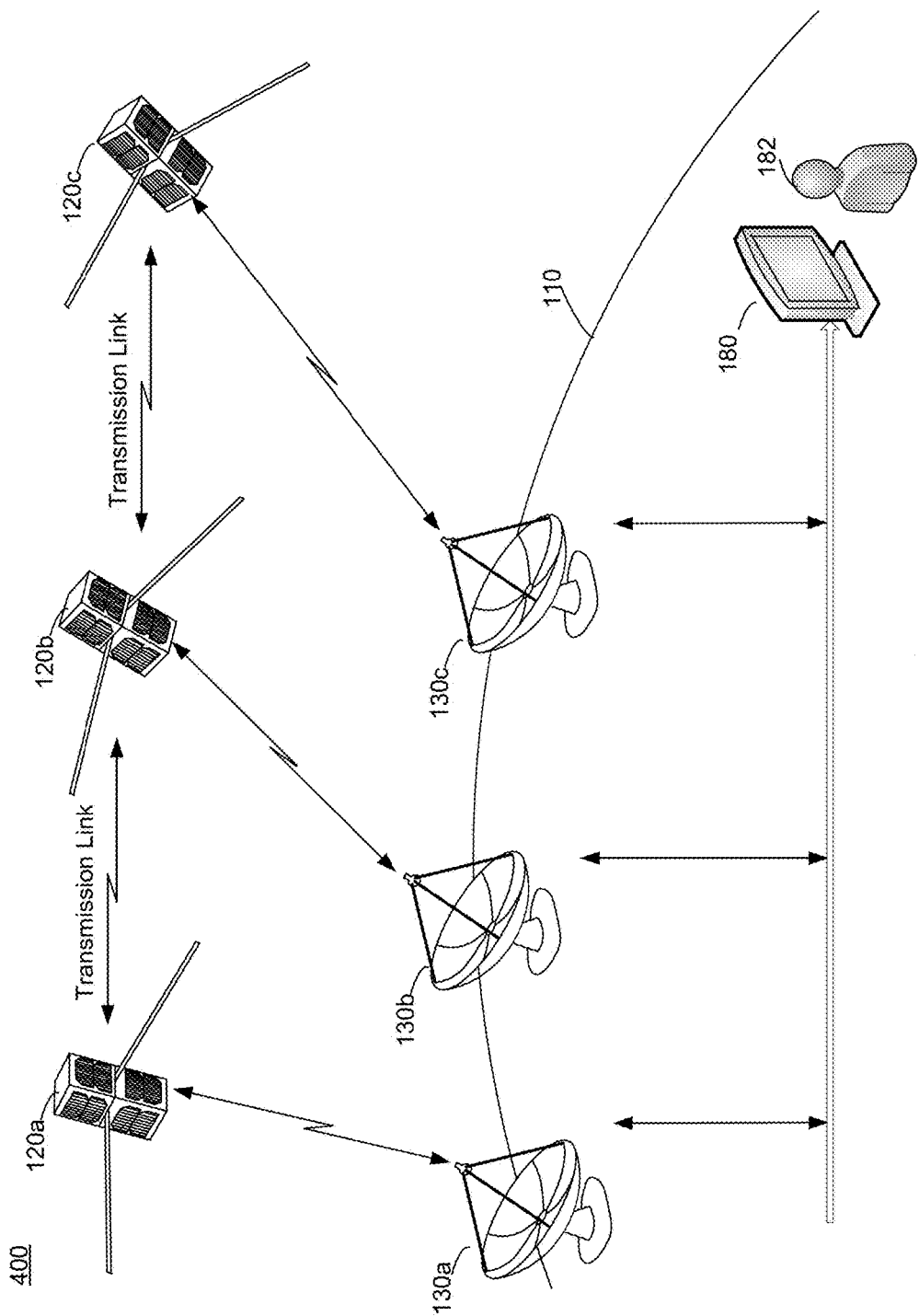
FIG. 4 illustrates communications between satellites, ground stations and a central communication center according to another aspect of the present technology.

FIG. 4 illustrates a series of ground stations 130 that may be strategically placed to facilitate tracking of multiple satellites 120 placed in orbit. Each ground station 130 may track one or more orbiting satellites 120. In this embodiment, each satellite 120 may independently communicate with a ground station 130 without relying on other satellites. For instance, satellites 120*a*, 120*b* and 120*c* may establish respective communications with ground stations 130*a*, 130*b* and 130*c*.

3. Central Communication Center

With continued reference to FIGS. 3-4, in one embodiment, the ground station 130 may channel data received from the satellite 120 to a central communication center (CCC) 180 via a hardwired terrestrial network or a wireless network. In some examples, one or more ground stations 130 may be linked to the CCC 180 via terrestrial servers sourced by third party vendors such as Amazon servers. In one embodiment, one or more ground stations 130 and one or more CCC 180 may form a secure dedicated private network (DPN) as part of a virtual private network (VPN).

The ground station 130 may forward data stream broadcast by the satellite 120 to the CCC 180 without interruption. In one example, the ground station 130 may perform batch transmission to the CCC 180 each time when logging into a DPN.

In one example, the data stream broadcast by the satellite 120 may include but not limited to radio frequency information detected by the radio frequency system 230, visual data captured by the image sensor 240, and AIS signals detected by the AIS 250. The CCC 180 may analyze the data stream to determine a vessel's location, speed and bearing. The CCC 180 may provide a visual display to a user that portrays a vessel's true location, speed and bearing in real-time or near real-time.

4. Exemplary Operations

In one embodiment, a processor may determine a vessel's location, speed and bearing based on information detected by one or more satellites 120. The processor may refer to one or a collection of processors. The processor may be located at one or more satellites 120, the ground station 130, or the CCC 180. In one embodiment, processing tasks may be shared between the satellites 120, the ground stations 130 and the CCC 180 for more efficient use of resources.

In one embodiment, the processor may instruct one or more satellites 120 of the constellation of satellites to focus on a target area, such as a select region of ocean, or a target vessel or vessels. A target vessel may be a suspicious vessel. The processor may identify the target area by providing location information of the target area to the satellite. The processor may identify the target vessel by providing its last known location information. The vessel's last known location may be determined based on the location of a satellite as determined by the satellite's geographic determination module 270 when the satellite detected the vessel last time.

Each satellite 120 may use its radio frequency system 230 to detect radio transmissions from any vessel. Each satellite 120 may use its image sensor 240 to capture images of the target area or vessels. Each satellite 120 may use its AIS 250 to detect AIS signals broadcast by any vessel. All information detected by each satellite 120 may be transferred to the processor at real time or quasi real time.

The processor may integrally process the detected information provided by each satellite 120, including visual information, RF signals, and AIS signals, to determine the vessel's location, speed and bearing.

In one embodiment, to determine a vessel's location, the processor may receive a first image from a first satellite taken at a particular time, a second image from a second satellite taken at about the same time, and perform image recognition to determine if both images capture the same vessel. Each image may be associated with its respective satellite location and orientation when the image is taken. For instance, the first image may be associated with the first satellite's location and orientation when the first image was taken, and the second image may be associated with the second satellite's location and orientation when the second image was taken. If both images capture the same vessel, the processor may determine an overlapping region between the two images. The overlapping region may be deemed as the vessel's location. The more satellites capturing the same vessel at the same time, the more accurate the determination.

In one embodiment, the processor may perform triangulation based on the first satellite's location and orientation when the first image is taken, as well as the second satellite's location and orientation when the second image is taken to determine the vessel's location. The processor may determine the vessel's heading and bearing based on the triangulation.

In one embodiment, the processor may receive a plurality of images from one or more satellites. The plurality of images may be successive images taken within a time frame. In the alternative, the plurality of images may be images taken by one or more satellites during consecutive passes of the same area. Each image may be associated with a timestamp and geolocation including the satellite's location and orientation when the image is taken. The processor may perform image recognition to determine if each image captures the vessel, and determine the vessel's speed and bearing based on images that capture the vessel, more specifically, based on timestamps and geolocation of the images.

In one embodiment, the processor may combine images of an area taken from multiple angles (i.e. from multiple satellites aimed at the same area) to form a multi-dimensional view of the area to enhance vessel detection based on the images.

In another embodiment, the processor may rely on the radio frequency (RF) spectrum signals as detected by the radio receiver 232 of one or more satellites to determine the vessel's location. In one example, the processor may perform Doppler spectrum analysis of the RF spectrum signals as received by one or more satellite to determine the vessel's location. The processor may determine the vessel's location based on RF spectrum signals received from a first RF receiver on a first satellite and a second RF receiver on a second satellite. The processor may also rely on the RF spectrum signals from the two satellites to determine the vessel's speed and bearing.

In another configuration, the processor may detect variance between image data and AIS signals as detected by the satellites. For example, the processor may compare the vessel's location, speed and bearing as determined from the images to the vessel's reported location, speed and bearing as revealed by its AIS message to determine any discrepancy.

for example, the processor may process the captured images in conjunction with the AIS signals as detected by the satellites to enhance overall tracking of vessels. Each image may be associated with a satellite's location and orientation when the image is taken. Such information may be used in conjunction with the AIS signals to determine a vessel's location, speed and bearing. In one embodiment, the processor may process image data to determine one or more vessels from the image data (e.g. locate a vessel on the open water) and that can be correlated with the identifying AIS signals to identify each vessel in the image based on their respective AIS signals. For vessels identified in the image but do not have matching AIS signals, such vessels may be deemed rogue vessels that fail to transmit their AIS data or transmit incorrect AIS data. Such vessels may likely be engaged in legally questionable activities.

Determination of the vessel's location, speed and bearing may be greatly improved over time as an increasing number of images capturing the same vessel grows is analyzed.

In one embodiment, the processor may output the determined location, speed and bearing of the vessel to a user, an operator or a relevant authority 182 as illustrated in FIGS. 3-4.

If the processor deems the vessel suspicious, for example, when the processor determines there is a discrepancy between the vessel's location, speed and bearing as determined and the vessel's reported location, speed and bearing, the processor may output a signal to notify surrounding vessels or relevant authorities.

The data output by the processor may be in any format. For example, the processor may output for display a notification regarding the determined location, speed and bearing of any vessel, and any discrepancy between the determined data and the vessel's reported data.

In one embodiment, the processor may output for display a graphical illustration of a first image as provided by a first satellite and a second image as provided by a second satellite, where both images were taken at about the same time of the same vessel. The processor may output for display the two images in an at least partially overlapping manner, where a common area between the two images is shown as overlapped. The common area may be deemed as the determined location of the vessel.

In one embodiment, the processor may output images, AIS signals and RF signals as received from the satellites. Relevant personnel may review the output, and detect any variance and take any necessary actions.

In one embodiment, the processor may send the determined location of the vessel to a non-transitory computer-readable storage medium for tracking the vessel's path. In one embodiment, the processor may output for display a polar coordinates graph to illustrate the vessel's path.

Figure 5:
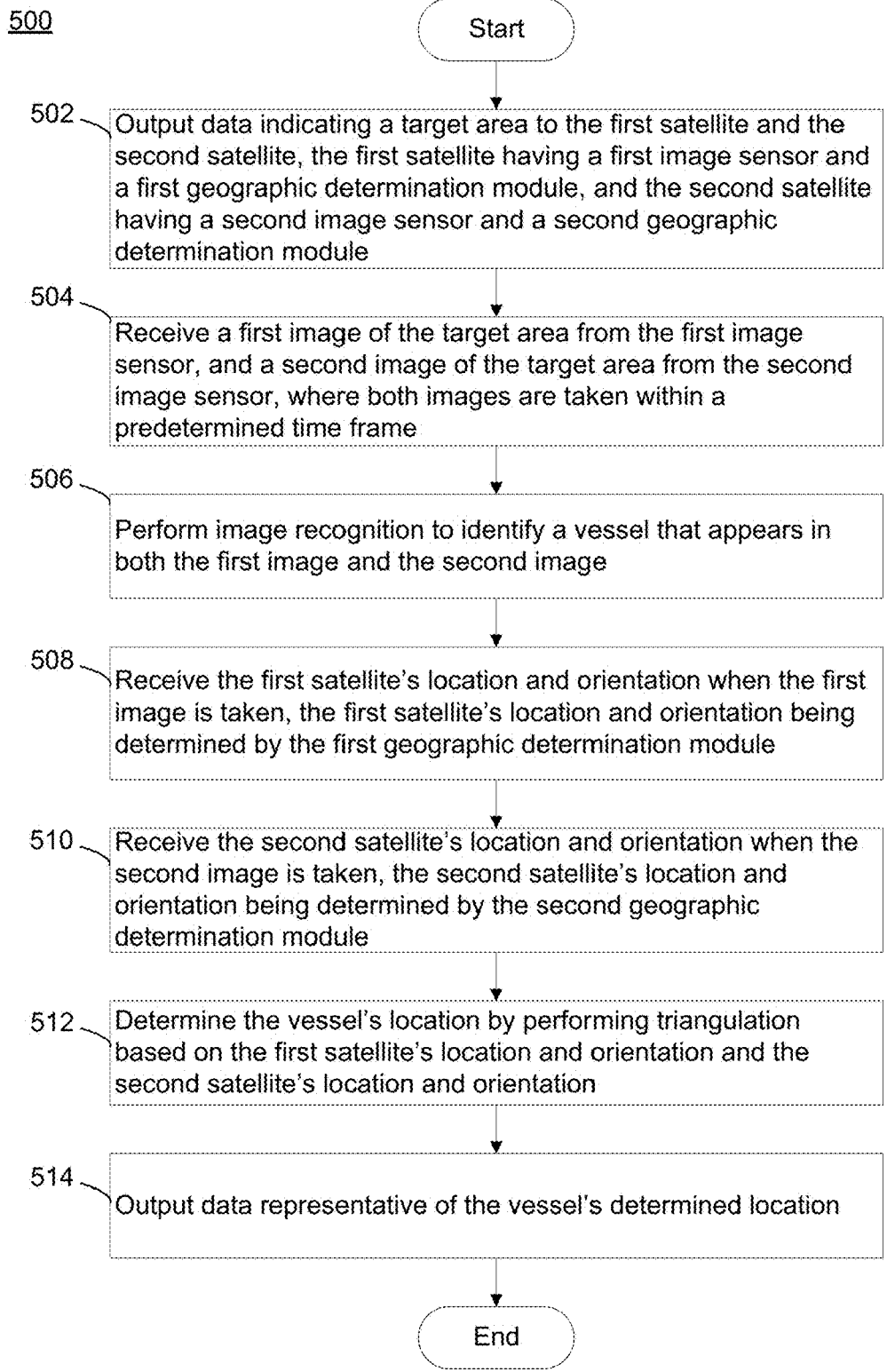
FIG. 5 is a flow chart illustrating example steps that may be executed by a processor to determine a vessel's location in a target area according to one aspect of the present technology.

FIG. 5 is a flow chart 500 illustrating example steps that may be executed by the processor to determine a vessel's location in a target area. At 502, the processor may output data indicating a target area to the first satellite and the second satellite. As a result, the first satellite and the second satellite may monitor the target area. The first satellite may have a first image sensor and a first geographic determination module. The second satellite may have a second image sensor and a second geographic determination module. At 504, the processor may receive a first image of the target area from the first image sensor, and a second image of the target area from the second image sensor, where both images are taken within a predetermined time frame. The predetermined time frame may be short enough that the two images may be presumed to be taken at about the same time. At 506, the processor may perform image recognition to identify a vessel that appears in both the first image and the second image. At 508, the processor may receive the first satellite's location and orientation when the first image is taken. The first satellite's location and orientation are determined by the first geographic determination module. At 510, the processor may receive the second satellite's location and orientation when the second image is taken. The second satellite's location and orientation are determined by the second geographic determination module. At 512, the processor may determine the vessel's location by performing triangulation based on the first satellite's location and orientation and the second satellite's location and orientation. The processor may also determine the vessel's speed and bearing by performing triangulation. At 514, the processor may output data representative of the vessel's location. The processor may also output data representative of the vessel's speed and bearing.

Figure 6:
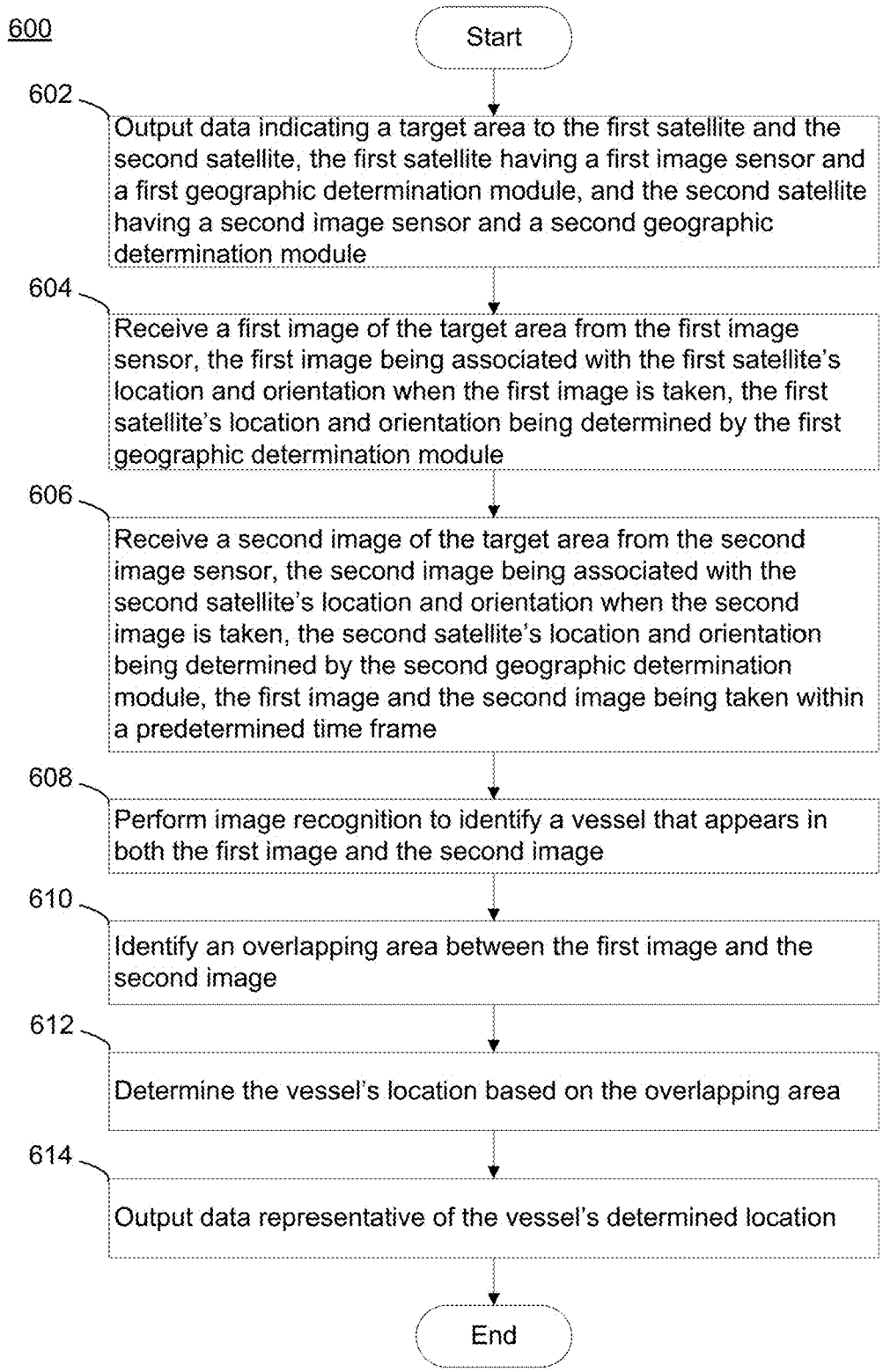
FIG. 6 is a flow chart illustrating example steps that may be executed by a processor to determine a vessel's location in a target area according to another aspect of the present technology.

FIG. 6 is a flow chart 600 illustrating example steps that may be executed by the processor to determine a vessel's location in a target area according to another embodiment. At 602, the processor may output data indicating a target area to the first satellite and the second satellite. The first satellite may have a first image sensor and a first geographic determination module. The second satellite may have a second image sensor and a second geographic determination module. At 604, the processor may receive a first image of the target area from the first image sensor. The first image may be associated with the first satellite's location and orientation when the first image is taken. The first satellite's location and orientation may be determined by the first geographic determination module. At 606, the processor may receive a second image of the target area from the second image sensor. The second image may be associated with the second satellite's location and orientation when the second image is taken. The second satellite's location and orientation may be determined by the second geographic determination module. The first image and the second image may be taken within a predetermined time frame. At 608, the processor may perform image recognition to identify a vessel that appears in both the first image and the second image.

At 610, the processor may identify an overlapping area between the first image and the second image. At 612, the processor may determine the vessel's location based on the overlapping area. At 614, the processor may output data representative of the vessel's determined location.

Figure 7:
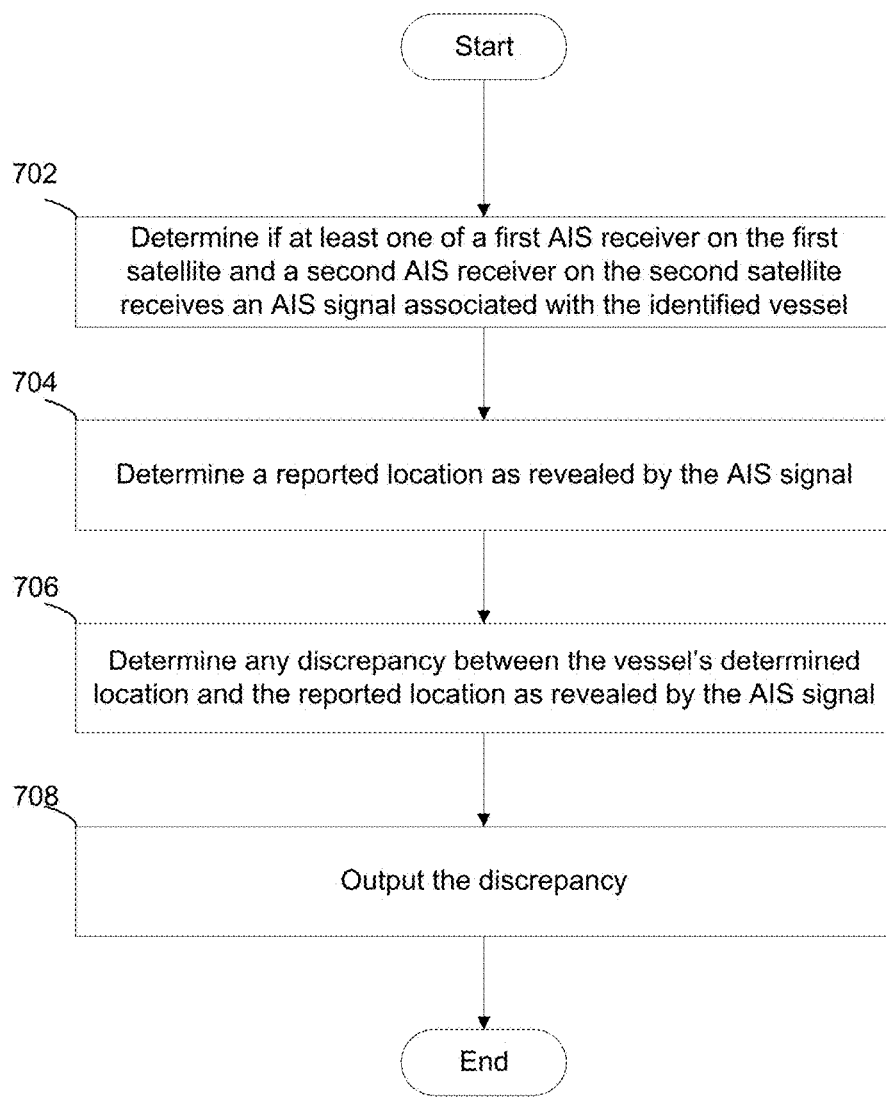
FIG. 7 is a flow chart illustrating example steps that may be executed by a processor to identify any suspicious vessel according to one aspect of the present technology.

FIG. 7 is a flow chart 700 illustrating another set of example steps that may be executed by the processor to identify any suspicious vessel. At 702, the processor may determine if at least one of a first AIS receiver on the first satellite and a second AIS receiver on the second satellite receives an AIS signal associated with the identified vessel. At 704, the processor may determine a reported location as revealed by the AIS signal. At 706, the processor may determine any discrepancy between the vessel's determined location and the reported location as revealed by the AIS signal. The processor may also determine any discrepancy between the vessel's determined speed and bearing and the reported speed and bearing as revealed by the AIS signal. At 708, the processor may output the discrepancy.

Figure 8:
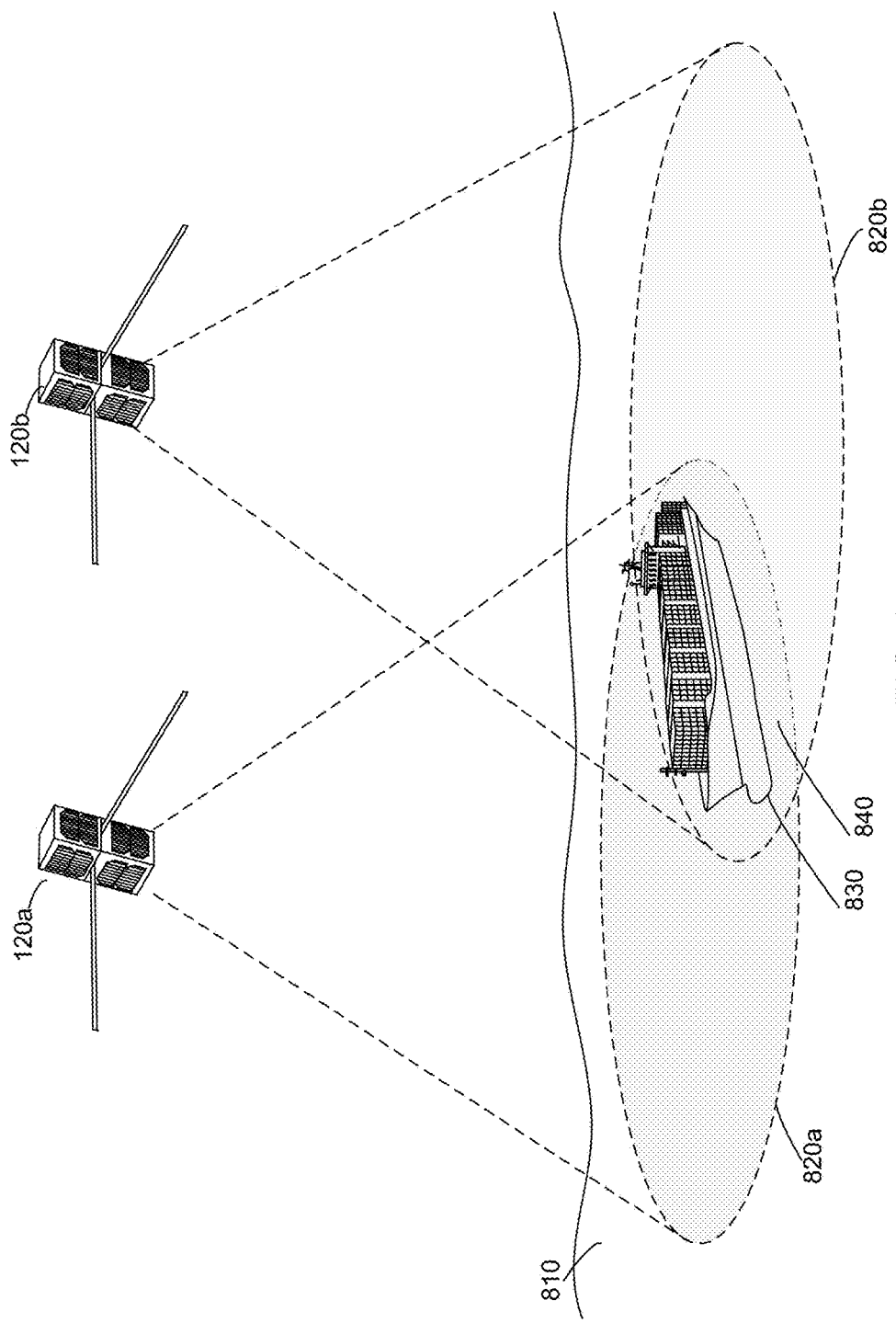
FIG. 8 illustrates two satellites capturing snapshots of a vessel according to one aspect of the present technology.

By way of example, with reference to FIG. 8, two satellites 120a and 120b are tasked to monitor a target area 810 in an ocean. The first satellite 120a is equipped with a first camera, and the second satellite 120b is equipped with a second camera. The first camera takes a first image 820a, while the second camera takes a second image 820b at about the same time. Both satellites 120a and 120b may send the following information to a processor for analysis: the images 820a and 820b, and each satellite's location and orientation when the images are taken. By performing image recognition on each image, the processor identifies a vessel 830 that appears in both images. In one example, the processor determines the location of the vessel 830 by performing triangulation based on the first satellite's location and orientation and the second satellite's location and orientation. The processor may also determine the vessel's speed and bearing by performing triangulation. In another example, the processor identifies an overlapping area 840 between the first image 820a and the second image 820b, and determines the location of the vessel 830 based on the overlapping area 840. In some examples, the processor may determine the vessel's speed and bearing based on a plurality of images capturing the vessel 830. The plurality of images may be successive images taken within a time frame, or images taken by one or more satellites during consecutive passes of the same area. The satellites 120a and 120b may also send to the processor any received AIS signals. The processor may determine if any AIS signal is associated with the vessel 830. If any AIS signal includes a reported location of the vessel 830, the processor may determine any discrepancy between the reported location of the vessel 830 and the determined or true location of the vessel 830. Similarly, if any AIS signal includes reported speed and bearing of the vessel 830, the processor may determine any discrepancy between the reported speed and bearing and the determined or true speed and bearing of the vessel. If discrepancy does exist, the vessel 830 is likely engaging in legally questionable activities or is creating a safety hazard. The processor may alert an operator or relevant authorities about vessel 830.

While certain implementations of the disclosed technology have been described in connection with what are presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. For example, the disclosed technology may be implemented in an aerospace device or system, including but not limited to, satellite communication systems of all sizes, and aircrafts including airplanes, jets, and air balloon, among other possibilities. The disclosed technology may serve multiple purposes, including monitoring maritime activities, monitoring trade transit, general aviation, commercial and private purposes including transport and cargo services, and military purposes, among other possibilities. Further, the disclosed technology may not only detect vessels, but may also detect other vehicles including but not limited to airplanes, trains and cars, or any moving object.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such as to perform one or more functions as specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for determining a vessel's location in a target area, comprising:
 a first image sensor on a first satellite;
 a first geographic determination module on the first satellite including a first receiver for determining location of the first satellite;
 a second image sensor on a second satellite;
 a second geographic determination module on the second satellite including a second receiver for determining location of the second satellite; and
 a processor in communication with the first image sensor and the second image sensor, the processor configured to:
  output data indicating a target area to the first satellite and the second satellite;
  receive a first image of the target area from the first image sensor, and a second image of the target area from the second image sensor, both images being taken within a predetermined time frame;
  perform image recognition to identify a vessel that appears in both the first image and the second image;
  receive the first satellite's location and orientation when the first image is taken, the first satellite's location and orientation being determined by the first geographic determination module;
  receive the second satellite's location and orientation when the second image is taken, the second satellite's location and orientation being determined by the second geographic determination module;
  determine the vessel's location by performing triangulation based on the first satellite's location and orientation and the second satellite's location and orientation; and
  output data representative of the vessel's determined location.

2. The system of claim 1, wherein the processor determines the vessel's speed and bearing by performing triangulation based on the first satellite's location and orientation and the second satellite's location and orientation.

3. The system of claim 1, wherein the first satellite and the second satellite are small form factor satellites.

4. The system of claim 1, further comprising a first Automatic Identification System (AIS) receiver on the first satellite and a second AIS receiver on the second satellite, wherein the processor is further configured to:
 determine if at least one of the first AIS receiver and the second AIS receiver receives an AIS signal associated with the identified vessel;
 determine a reported location as revealed by the AIS signal;
 determine any discrepancy between the vessel's determined location and the reported location as revealed by the AIS signal; and
 output the discrepancy.

5. The system of claim 1, further comprising a first radio frequency (RF) receiver on the first satellite and a second RF receiver on the second satellite.

6. The system of claim 5, wherein the processor is further configured to determine at least one of the vessel's location, speed and bearing based on signals received by the first RF receiver and the second RF receiver.

7. A method for determining a vessel's location in a target area, comprising:
 outputting, by a processor, data indicating a target area to a first satellite and a second satellite;
 receiving, by the processor, a first image of the target area from a first image sensor on the first satellite, and a second image of the target area from a second image sensor on the second satellite, both images being taken within a predetermined time frame;
 performing, by the processor, image recognition to identify a vessel that appears in both the first image and the second image;
 receiving, by the processor, the first satellite's location and orientation when the first image is taken, the first satellite's location and orientation being determined by a first geographic determination module on the first satellite;
 receiving by the processor, the second satellite's location and orientation when the second image is taken, the second satellite's location and orientation being determined by a second geographic determination module on the second satellite;
 determining, by the processor, the vessel's location by performing triangulation based on the first satellite's location and orientation and the second satellite's location and orientation; and
 outputting, by the processor, data representative of the vessel's determined location.

8. The method of claim 7, further comprising determining, by the processor, the vessel's speed and bearing by performing triangulation based on the first satellite's location and orientation and the second satellite's location and orientation.

9. The method of claim 7, further comprising:
 determining, by the processor, if at least one of a first AIS receiver on the first satellite and a second AIS receiver on the second satellite receives an AIS signal associated with the identified vessel;
 determining, by the processor, a reported location as revealed by the AIS signal;

determining, by the processor, any discrepancy between the vessel's determined location and the reported location as revealed by the AIS signal; and outputting, by the processor, the discrepancy.

10. The method of claim 7, further comprising:

determining, by the processor, at least one of the vessel's location, speed and bearing based on signals received by a first RF receiver on the first satellite and a second RF receiver on the second satellite.

11. A system for determining a vessel's location in a target area, comprising:

a first image sensor on a first satellite;

a first geographic determination module on the first satellite for determining location of the first satellite;

a second image sensor on a second satellite;

a second geographic determination module on the second satellite for determining location of the second satellite;

a first Automatic Identification System (AIS) receiver on the first satellite;

a second AIS receiver on the second satellite; and a processor in communication with the first image sensor and the second image sensor, the processor configured to:

output data indicating a target area to the first satellite and the second satellite;

receive a first image of the target area from the first image sensor, and a second image of the target area from the second image sensor, both images being taken within a predetermined time frame;

perform image recognition to identify a vessel that appears in both the first image and the second image;

receive the first satellite's location and orientation when the first image is taken, the first satellite's location and orientation being determined by the first geographic determination module;

receive the second satellite's location and orientation when the second image is taken, the second satellite's location and orientation being determined by the second geographic determination module;

determine the vessel's location by performing triangulation based on the first satellite's location and orientation and the second satellite's location and orientation;

determine if at least one of the first AIS receiver and the second AIS receiver receives an AIS signal associated with the vessel;

determine a reported location as revealed by the AIS signal;

determine a discrepancy between the vessel's determined location and the reported location as revealed by the AIS signal; and output the discrepancy to notify a surrounding vessel or a relevant authority that the vessel is suspicious.

* * * * *